(12) United States Patent
Akimoto et al.

(10) Patent No.: US 8,042,648 B2
(45) Date of Patent: Oct. 25, 2011

(54) MATERIAL FOR PROCESSING AND MOLDED MEMBER USING THE SAME

(75) Inventors: Kazuyo Akimoto, Osaka (JP); Yoshinori Doumoto, Osaka (JP); Ichiro Yamagiwa, Hyogo (JP); Kyoko Masuda, Hyogo (JP); Mitsuo Hino, Aichi (JP)

(73) Assignees: Sanwa Packing Industry Co., Ltd., Osaka (JP); Kabushiki Kaisha Kobe Seiko Sho, Hyogo (JP)

( * ) Notice: Subject to any disclaimer, the term of this patent is extended or adjusted under 35 U.S.C. 154(b) by 0 days.

(21) Appl. No.: 12/909,363

(22) Filed: Oct. 21, 2010

(65) Prior Publication Data
US 2011/0094824 A1   Apr. 28, 2011

Related U.S. Application Data

(63) Continuation of application No. PCT/JP2009/057786, filed on Apr. 17, 2009.

(30) Foreign Application Priority Data

Apr. 21, 2008 (JP) ................................. 2008-134794
Feb. 12, 2009 (JP) ................................. 2009-029654

(51) Int. Cl.
*F02B 77/13* (2006.01)
(52) U.S. Cl. ........................ 181/204; 181/205
(58) Field of Classification Search .......... 181/204, 181/205, 282, 283
See application file for complete search history.

(56) References Cited

U.S. PATENT DOCUMENTS 5,036,947 A * 8/1991 Metzger ................... 181/241

FOREIGN PATENT DOCUMENTS

| JP | 02-001462 Y2 | 1/1990 |
|---|---|---|
| JP | 10-266850 A | 10/1998 |
| JP | 2001-347323 A | 12/2001 |
| JP | 2002-113525 A | 4/2002 |
| JP | 2004-360496 A | 12/2004 |
| JP | 2005-188400 A | 7/2005 |

OTHER PUBLICATIONS

English translation of JP 2002-113525 A.*
International Search Report for International Application No. PCT/JP2009/057786 mailed on Jun. 30, 2009, 2 pages.
Patent Abstracts of Japan, Publication No. 10-266850, Publication Date: Oct. 6, 1998, 1 page.

(Continued)

*Primary Examiner* — Jeremy Luks
(74) *Attorney, Agent, or Firm* — Osha • Liang LLP

(57) ABSTRACT

A material for processing includes an elastically deformable single thin plate comprising a plurality of through-holes. The plate has a first wave-like shape, which is formed in a first direction and, in which troughs and ridges are alternately connected in repetition, and a second wave-like shape which is formed in a second direction crossing the first direction and in which troughs and ridges are alternately connected in repetition. The first wave-like shape has a corrugated shape in which the ridges each include a pair of side parts rising from the corresponding troughs and an apex part connected between the pair of side parts. An apex length of the apex part along the first direction is defined as being longer than an opening length, along the first direction, between base parts of the pair of side parts.

4 Claims, 8 Drawing Sheets

OTHER PUBLICATIONS

English abstract of JP2001-347323 published on Dec. 18, 2001, espacenet database, 1 page.
English abstract of JP2004-360496 published on Dec. 24, 2004, espacenet database, 1 page.
English abstract of JP2005-188400 published on Jul. 14, 2005, espacenet database, 1 page.
Office Action issued in Japanese Application No. 2009-029654 mailed on Aug. 24, 2010 and English translation thereof, 4 pages.

* cited by examiner

MATERIAL FOR PROCESSING AND MOLDED MEMBER USING THE SAME

CROSS-REFERENCE TO RELATED APPLICATIONS

This is a continuation application of PCT/JP2009/057786 filed on Apr. 17, 2009 which claims priority from a Japanese Patent Applications No. 2008-134794 filed on Apr. 21, 2008 and No. 2009-029654 filed on Feb. 12, 2009, the contents of which are incorporated herein by reference.

BACKGROUND OF INVENTION

1. Field of the Invention

The present invention relates to a material for processing usable for, for example, a target which generates vibration or noise and formed of a single thin plate performing a vibration damping function or a sound absorption function on the target, and a molded member using the same.

2. Background Art

One example of such a target which generates vibration is an internal combustion engine. From a main body of an internal combustion engine or an exhaust system connected to the internal combustion engine such as an exhaust manifold or the like, heat, noise, vibration or the like is released outside. In order to prevent an unnecessary release of vibration from a vibration source such the internal combustion engine main body, the exhaust system or the like to the outside, various types of covers such as an insulator are used for the vibration source.

FIG. 18 is an isometric view of a typical conventional exhaust manifold insulator 1 (hereinafter, referred to as the "insulator") described in Japanese Laid-Open Patent Publication No. 10-266850 (e.g., paragraph 8 through 11, and FIG. 1 of the reference) mentioned below. Hereinafter, the insulator 1 will be described with reference to FIG. 18.

The insulator 1 is attached to, and covers, an exhaust manifold of an internal combustion engine. The insulator 1 includes a substantially flat front part 1a and a side part 1b bent from the front part 1a and extending toward a cylinder head of the internal combustion engine. The insulator 1 is formed of an assembly of two steel plates 1A and 1B brought together, and one of the two steel plates is folded onto the other steel plate along a folding line at least one appropriate position on an edge of each slit 2. This folding arrangement reinforces the bonding of the two steel plates 1A and 1B.

Due to the structure in which the two steel plates 1A and 1B are brought together, the conventional insulator 1 acts such that the vibration at a frequency of several thousand cycles per minute generated from the exhaust manifold, in which high temperature exhaust gas pulsating at such a frequency passes, is not unnecessarily released to an outside environment.

Such a conventional insulator has a structure in which two steel plates 1A and 1B are brought together as described above, and has a problem of being relatively heavy. There is another problem that the insulator 1 causes plane vibration due to vibration propagated from the exhaust manifold, and when the vibration frequency matches the resonance frequency of the insulator 1, the insulator 1 itself becomes a source of noise.

SUMMARY OF INVENTION

Recently, there has been an attempt to produce thinner internal combustion engines and exhaust manifolds of a more lightweight alloy in order to reduce the weight thereof. Therefore, the insulator is also desired to be more lightweight and also to have a still improved vibration damping performance.

In light of these points, the present inventors studied a mechanism for realizing a vibration damping function, a sound insulation function and a sound absorption function of the insulator, and as a result, achieved the present invention described below.

One or more embodiments of the present invention provide a material for processing which is significantly improved in vibration damping performance, sound insulation performance and sound absorption performance and is capable of reducing the weight of, and improving the mechanical strength of, a product, and a molded member using such a material for processing.

A material for processing defined by claim 1 comprises an elastically deformable single thin plate having a plurality of through-holes, which has a first wave-like shape which is formed in a first direction and in which troughs and ridges are alternately connected in repetition and also has a second wave-like shape which is formed in a second direction crossing the first direction and in which troughs and ridges are alternately connected in repetition. The first wave-like shape has a corrugated shape in which the ridges each include a pair of side parts rising from the corresponding troughs and an apex part connected between the pair of side parts, and an apex length of the apex part along the first direction is defined as being longer than an opening length, along the first direction, between base parts of the pair of side parts; the troughs and the ridges have the through-holes therein; the ridges are formed to have a predetermined height with respect to the troughs; and the material for processing is attachable to a vibration generating member at a position a predetermined interval away therefrom.

A molded member defined by claim 2 comprises a material for processing according to claim 1 formed to have a three-dimensional shape in accordance with a vibration generating member; and the vibration generating member to which the material for processing is attached at a predetermined interval.

In a molded member defined by claim 3 according to claim 2, either one of the first direction and the second direction of the material for processing is defined as crossing a ridge portion of the three-dimensional shape.

According to one or more embodiments of the present invention defined by claim 1, a material for processing according to one or more embodiments of the invention is formed by providing the above-described corrugated shape on an elastically deformable single thin plate having a plurality of through-holes. The troughs and the ridges have the through-holes therein; the ridges are formed to have a predetermined height with respect to the troughs; and the material for processing is attachable to a vibration generating member at a position a predetermined interval away therefrom. Therefore, the following sound absorption function and vibration-released sound reduction function are realized.

The material for processing according to one or more embodiments of the present invention has through-holes in itself. When the material for processing vibrates and the air passes the through-holes, the energy is attenuated by the friction of an end face which is a part of each of the through-holes of the material for processing and the air. Therefore, the energy of sound wave, which is vibration of air, is converted into thermal energy, and thus the sound absorption performance is provided. The frequency band in which the sound absorption performance is provided is determined based on size and shape such as the equivalent hole diameter of the through-holes, the numerical aperture, the thickness of the plate and the like.

According to one or more embodiments of the present invention, the thin plate is easy to move entirely in the same phase due to the rib reinforcing effect provided by the ridges and the troughs. It has been confirmed that provision of the through-holes in the thin plate reduces the sound releasing efficiency, which is an energy conversion efficiency at which the vibration of the material for processing is converted into sound, as compared with the case without the through-holes. Due to this, even where the material for processing according to one or more embodiments of the present invention is vibrating, the sound released from the material for processing can be absorbed.

It is known that the vibration-released sound reduction effect provided by forming the through-holes in the thin plate is decreased when the plane vibration of the thin plate is partially different in amplitude and/or phase, namely, when there is a vibration distribution on the surface of the material for processing. However, where there are concaved and convexed portions formed of the ridges and the troughs on the surface of the material for processing and the above-described rib effect is provided as in one or more embodiments of the present invention, the vibration distribution can be reduced to make the vibration-released sound reduction effect conspicuous. Due to the vibration-released sound reduction effect, the noise generated by the material for processing itself can be reduced.

In one or more embodiments of the present invention, there are concaved and convexed portions in the planar direction formed of the troughs and the ridges, and the troughs and the ridges have through-holes therein. Therefore, a sound resonance mechanism is formed by an air layer having a thickness defined by the distance between the top surface of the ridges and the bottom surface of the troughs, and so the sound absorption performance is provided. The sound absorption performance is also provided by the energy attenuation caused by the friction of the air passing the through-holes provided in the apex part of the ridges. The sound absorption performance realized by the through-holes is provided in the vicinity of the sound resonance frequency band defined based on the size and shape such as the equivalent hole diameter of the through-holes, the numerical aperture, the thickness of the plate and the like.

In addition, the absorption ratio of the vertically incident sound in one or more embodiments of the present invention has two peak frequency bands, i.e., a first frequency band and a second frequency band. The first peak frequency band, which is lower of the two frequency bands, is defined by a frequency band caused by resonance of the air layer, defined by a distance between the ridges and the vibration generating member, and the through-holes formed in the ridges, and by the resonance of the air layer, defined by the distance between the troughs and the vibration generating member, and the through-holes formed in the troughs. The second frequency band, which is the higher of the two frequency bands, is a frequency band caused by resonance of the air layer, defined by a distance between the ridges and the troughs, and the through-holes formed in the ridges.

Due to such combined sound absorption effects provided by the attenuation of energy, the distance between the ridges and the vibration generating member or the troughs can be appropriately adjusted so as to provide a vibration-released sound reduction effect suitable to the frequency band for which the vibration-released sound needs to be reduced.

In addition to the above-described functions/effects, in the material for processing according to one or more embodiments of the present invention, the first wave-like shape and the second wave-like shape are respectively formed in the first direction and the second direction. In the first wave-like shape, the ridges each include a pair of side parts rising from the corresponding troughs and an apex part connected between the pair of side parts, and the apex length of the apex part along the first direction is defined as being longer than the opening length, along the first direction, between the base parts of the pair of side parts.

Therefore, according to one or more embodiments of the present invention, when a material for processing as described above is processed into a product having a desired shape by pressing or the like, the wave-like shapes are expanded or contracted. Therefore, a portion of the thin plate having the wave-like shapes which is expandable in the first direction when the thin plate is processed is significantly larger than that of a flat thin plate. This is guaranteed by that in the first wave-like shape, the apex length of the apex part along the first direction is defined as being longer than the opening length, along the first direction, between the base parts of the pair of side parts.

In the case where the apex length is not longer than the opening length, the portion of the material for processing which is expandable when the material for processing is pressed cannot be sufficiently large. This decreases the processability of the product. As a result, cracks may be generated or the product may not be formed to have an intended shape. According to one or more embodiments of the present invention, the possibility of such inconveniences can be prevented, and the quality of the material for processing can be significantly improved.

With the material for processing according to one or more embodiments of the present invention, the processability in the second direction is sufficiently improved. This is guaranteed by that the thin plate has the second wave-like shape in the second direction.

The material for processing according to one or more embodiments of the present invention has the first and second wave-like shapes in which the troughs and the ridges are alternately connected in repetition. Namely, in the first and second wave-like shapes, there is no flat part between adjacent cycles each formed of a trough and a ridge. If there is such a flat part, there may be inconveniences that, for example, the flat part generates plane vibration having a large amplitude or has a low mechanical strength due to being flat.

One or more embodiments of the present invention prevent the generation of such inconveniences and so can significantly improve the quality of the product produced using the material for processing.

As described above, the material for processing according to one or more embodiments of the present invention are significantly improved in processability as compared with a flat thin plate.

According to one or more embodiments of the present invention, there is no limitation on the material of the thin plate, but it is clear that the characteristic functions/effects of one or more embodiments of the present invention is more conspicuously realized when the thin plate is formed of an aluminum alloy or the like having a relatively low ductility and malleability than when the thin plate is formed of, for example, iron, stainless steel or the like having a relatively high ductility and malleability.

The material for processing according to one or more embodiments of the present invention can realize this functions/effects with a structure of a single thin plate. Therefore, the material for processing can be simplified in structure and made lightweight, and therefore can be reduced in cost.

According to one or more embodiments of the invention defined by claim 2, when the molded member formed of a material for processing vibrates by the vibration applied thereto from outside, the vibration is converted into elastic deformation of the thin plate at the troughs and the ridges in the wave-like shape. Due to this, a significant part of the vibration applied from outside is converted into thermal energy by the elastic deformation of the thin plate itself. Thus, the vibration of the molded member caused by the vibration received by the material for processing can be suppressed.

The material for processing according to one or more embodiments of the present invention can realize this functions/effects with a structure of a single thin plate. Therefore, the material for processing can be simplified in structure and made lightweight, and therefore can be reduced in cost.

The molded member according to one or more embodiments of the present invention is formed by processing the thin plate to have the wave-like shapes. Therefore, where the molded member has a bent shape and one surface of the molded member is convexed, the other surface is concaved. In this state, on the convexed surface side, the interval between the ridges of the wave-like shape is enlarged; whereas on the other surface side, the interval between the ridges of the wave-like shape is shortened.

Therefore, when one surface of the material for processing according to one or more embodiments of the present invention is put into contact with a member having small concaved and convexed portions or a member having a relatively soft surface (hereinafter, such a member will be referred to as the "substrate") and the material for processing is bent together with the substrate, the interval between the ridges of the material for processing on the side of the substrate is reduced in a portion in which the interval between the ridges of the wave-like shape on the side of the substrate is reduced. Thus, the material for processing and the substrate are meshed with, and fixed to, each other. Therefore, the material for processing can be attached to the substrate with no specific measure such as an adhesive or the like. For this reason also, the structure of the molded member according to the present invention can be simplified and made compact.

According to one or more embodiments of the present invention, the shape and structure of the molded member are defined by the shape of the material for processing which has been processed into the molded member. Therefore, according to one or more embodiments of the present invention, the shape and structure of the material for processing before the material for processing is processed into the molded member are arbitrary. Due to this, one or more embodiments of the present invention are applicable to a wide range of types of materials for processing as long as the shape and structure of the material for processing which has been processed into the molded member fulfill the conditions defined in claim 1.

The molded member according to one or more embodiments of the present invention includes a material for processing according to claim 1 formed to have a three-dimensional shape in accordance with a vibration generating member; and the vibration generating member to which the material for processing is attached at a predetermined interval. Therefore, the molded member according to one or more embodiments of the present invention realizes specific effects including the following effects in addition to the functions/effects described above.

According to one or more embodiments of the present invention, a first sound absorption structure is formed of an air layer which is provided between the molded member main body having the through-holes and the vibration generating member, and provides the sound absorption function. A sound resonance mechanism is formed of many through-holes formed in the molded member main body and a rear air layer between the molded member main body and the partition member, and thus the first sound absorption structure is formed.

A first sound absorption frequency band in which the sound absorption function is provided is determined based on the size and shape such as the equivalent hole diameter of the through-holes, the numerical aperture, the thickness of the plate and the like and also factors such as the thickness of the rear air layer defined by the distance between the molded member main body and the partition member, and the like.

Due to such a sound absorption function, the noise assumed to be caused by the molded member itself when the molded member is attached to the vibration source can be absorbed by the molded member itself after the noise is generated, and thus can be reduced.

In the case of the molded member according to one or more embodiments of the present invention, there are concaved and convexed portions in the planar direction formed of the ridges and troughs defined by claim 1, and the troughs and the ridges have through-holes therein. Therefore, in addition to the sound absorption function in the first sound absorption frequency band provided by the first sound absorption structure, a second sound absorption structure is formed. The second sound absorption structure is determined by the thickness of the air layer defined by the distance between the top surface of the ridges and the bottom surface of the troughs, and the size and shape such as the equivalent hole diameter of the gas pathways in the surface of the ridges, the numerical aperture, the thickness of the plate and the like. The sound absorption function is provided in the vicinity of the sound resonance frequency band, which is a second sound absorption frequency band defined by the size and shape, etc. described above.

The first sound absorption frequency band and the second sound absorption frequency band are different from each other because the above-described sizes, shapes and the like which define these frequency bands are different from each other. Therefore, in the case of a structure in which the conventional flat plate is combined with the air layer, or in the case of a mild concaved and convexed structure, namely, in the case of a concaved and convexed structure in which the apex length of the convexed portion is shorter than the opening length of the concaved portion, only the sound absorption characteristic around a single frequency band is provided. By contrast, according to one or more embodiments the present invention, as described above, the sound absorption function can be provided around frequency bands different from each other even with a single molded member main body. Therefore, a sound absorption characteristic over a wide band can be realized with a simple structure.

Due to such a sound absorption function, the noise assumed to be caused by the molded member itself when the molded member is attached to the vibration source can be absorbed by the molded member itself after the noise is generated, and thus can be reduced. Due to such combined sound absorption effects, the vibration or noise caused by the material for processing itself can be absorbed after the vibration or noise is generated, and thus can be reduced.

According to one or more embodiments of the present invention, the thin plate is easy to move entirely in the same phase due to the rib reinforcing effect provided by the ridges and the troughs. It has been confirmed that provision of gas pathways in the thin plate reduces the sound releasing efficiency, which is an energy conversion efficiency at which the vibration of the material for processing is converted into sound, as compared with the case without the gas pathways. Due to this, even where the material for processing according to one or more embodiments of the present invention is vibrating, the amplitude of the sound released from the material for processing can be reduced.

It is known that the vibration-released sound reduction effect provided by forming the gas pathways in the thin plate is decreased when the plane vibration of the thin plate is partially different in amplitude and/or phase, namely, when there is a vibration distribution on the surface of the material for processing. However, where there are concaved and convexed portions formed of the ridges and the troughs on the surface of the material for processing and the above-described rib effect is provided as in one or more embodiments of the present invention, the vibration distribution can be reduced to make the vibration-released sound reduction effect conspicuous. Due to the vibration-released sound reduction effect, the noise generated by the material for processing itself can be reduced.

According to one or more embodiments of the invention defined by claim 3, either one of the first direction and the second direction is defined as crossing a ridge portion of the three-dimensional shape. Due to this, the molded member according to one or more embodiments of the present invention realizes specific effects including the following effects in addition to the functions/effects described above.

In detail, in the case where the material for processing is used for forming the molded member which should suppress noise caused by the vibration source, the molded member formed using the material for processing vibrates by the transmission of vibration from the vibration source. When the molded member vibrates, it is assumed that parts thereof on both side of the ridge portions, along which the shape of the product is bent, vibrate as fluttering. When such vibration occurs, metal fatigue is caused in the vicinity of the ridge portions of the product due to the repeated bending, and cracks are likely to be generated.

According to one or more embodiments of the present invention, the material for processing, which is to be processed into a product, has wave-like shapes in the first direction and the second direction, respectively. For example, the first direction is defined as crossing, preferably perpendicularly, the ridge portions of the product. Therefore, the wave-like shapes act as ribs on the vibration around the ridge portions. Due to this, the vibration of the product can be suppressed, and the generation of cracks in the product can be prevented. Thus, the quality of the product can be significantly improved.

Other aspects and advantages of the invention will be apparent from the following description and the appended claims.

DETAILED DESCRIPTION

Embodiments of the present invention are explained below, referring to the attached figures. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the present invention can be carried out as, for example, an exhaust manifold cover attachable to an exhaust manifold of an internal combustion engine or the like for the purpose of preventing an unnecessary release of vibration or noise to the outside.

Example 1

Example 1 according to one or more embodiments of the present invention will be described with reference to FIG. 1 through FIG. 12.

Figure 1:
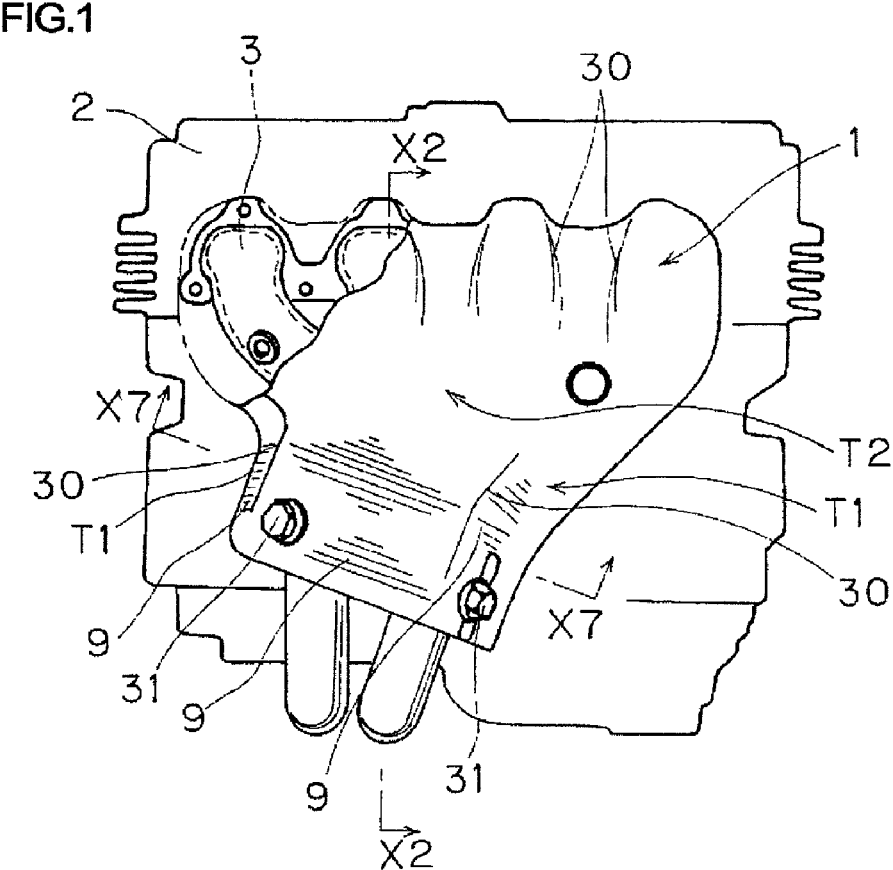
FIG. 1 is a front view of a metal cover 1 in Example 1 according to one or more embodiments of the present invention in the state of being attached to an exhaust manifold.
Figure 2:
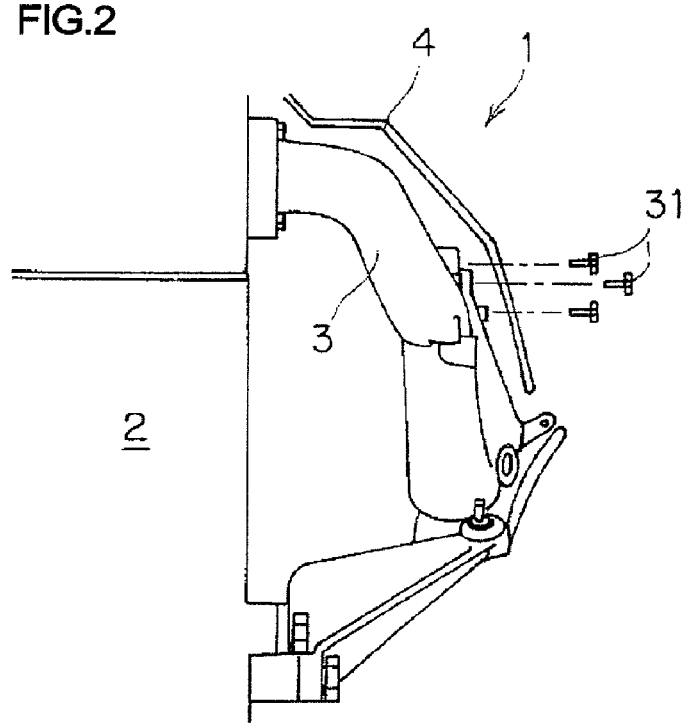
FIG. 2 is a cross-sectional view taken along line X2-X2 in FIG. 1.

Hereinafter, with reference to FIG. 1 and FIG. 2, the metal cover 1, which is a molded member, will be generally described. In the exhaust manifold 3 of an internal combustion engine such as an automobile engine 2 or the like, combustion exhaust gas pulsating at a frequency of several thousand cycles per minute at, for example, a high temperature of 600 to 700° C. passes from a combustion chamber of the internal combustion engine. Therefore, the exhaust manifold 3 itself, which is not the molded member, also obtains a high temperature and so becomes a heat source for causing high temperature heat radiation. The exhaust manifold 3 also becomes a vibration source for releasing noise, caused by the sound of fuel explosion in the engine 2, the movement of the combustion exhaust gas in the exhaust manifold 3 or the like, to an outside environment.

Figure 7:
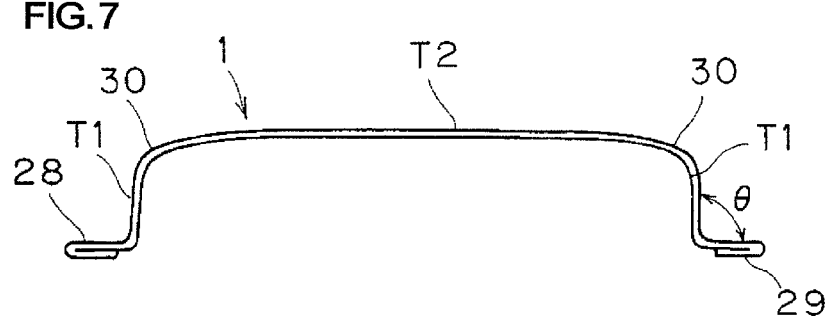
FIG. 7 is a simplified cross-sectional view taken along line X7-X7 in FIG. 1.

In this example, in order to suppress such vibration from the exhaust manifold 3 as much as possible, the metal cover 1 as the molded member having a structure described below is set so as to cover the exhaust manifold 3. As shown in FIG. 2, the metal cover 1 in this example is formed of a metal plate 4, which has a small thickness of 0.3 mm and is formed of an aluminum alloy having a specific gravity of about 2.7. As shown in FIGS. 1, 2 and 7, the metal cover 1 is formed three-dimensionally along an external shape of the exhaust manifold 3. The metal cover 1 includes a side wall T1 and an apex part T2 for connecting the entire circumferential edge of the side wall T1. The side wall T1 and the apex part T2 are continued to each other at an obtuse angle θ.

In this example, the metal plate 4 may be formed of any elastically deformable material with no specific limitation, for example, aluminum foil or aluminum alloy foil. In modified examples, the metal plate 4 may be formed of a thin plate of aluminum, an alloy thereof, stainless steel, or a synthetic resin such as an engineering plastic material or the like. In consideration of the weight reduction of the metal plate 4 described below, a thin plate of aluminum, an alloy thereof, a synthetic resin such as an engineering plastic material or the like is preferable.

Figure 3:
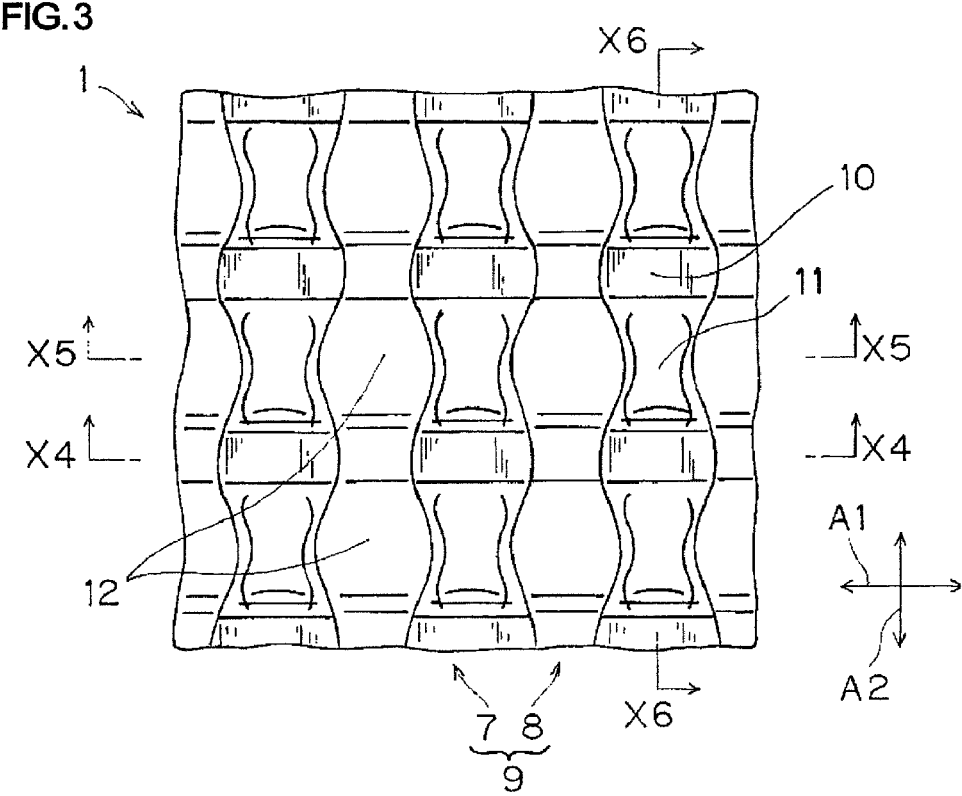
FIG. 3 is an enlarged front view of the metal cover 1.
Figure 4:
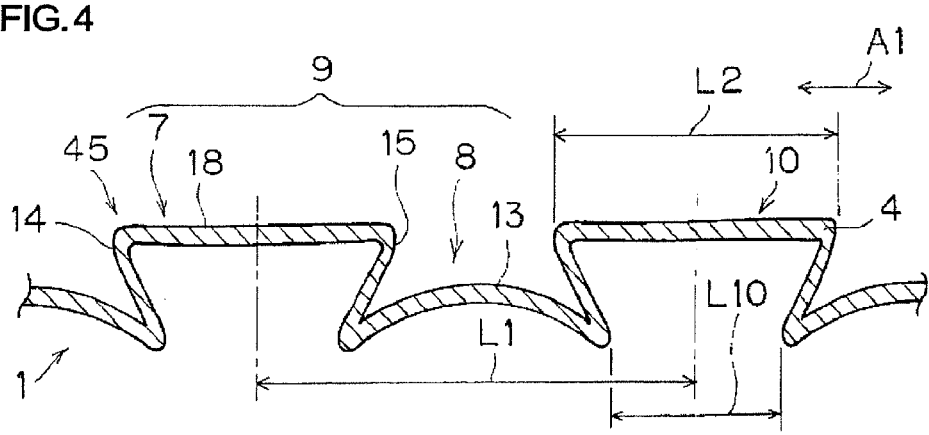
FIG. 4 is a cross-sectional view taken along line X4-X4 in FIG. 3.
Figure 5:
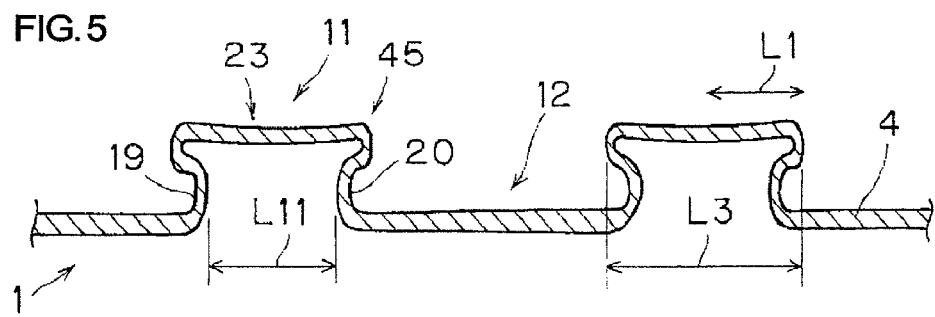
FIG. 5 is a cross-sectional view taken along line X5-X5 in FIG. 3.

The metal plate 4 used for the metal cover 1 in this example is formed of, for example, one aluminum alloy thin plate. As shown in FIGS. 1 through 6, the metal plate 4 has the following shape. In a first direction A1, the metal plate 4 has a wave-like shape 9 as a first wave-like shape, in which ridges 7 and troughs 8 are alternately connected a plurality of times. In a second direction A2 crossing, preferably perpendicularly, the first direction A1, the metal plate 4 has a similar wave-like shape 9a as a second wave-like shape, in which ridges 7a and troughs 8a are alternately connected. As shown in FIGS. 3 through 5, each ridge 7 includes first rising parts 10 and second rising parts 11 rising from the corresponding troughs 8 and located alternately in a longitudinal direction of the ridge 7. As shown in FIGS. 3 through 5, each trough 8 includes flat parts 12 and concaved parts 13 located alternately.

Each, or one cycle of the first rising parts 10 includes a pair of side walls 14 and 15 rising from the corresponding troughs 8 generally as forming an inverted trapezoid and a relatively flat apex part 18 formed as connecting tips of the side walls 14 and 15 to each other. The first rising part 10 is curved inward, and an apex length L2 of the apex part 18 along the first direction A1 is defined as being longer than an opening length L10 of a base part of the first rising part 10 along the first direction A1.

By contrast, the second rising part 11 has a shape of the first rising part 10 being crushed generally in a width direction at a predetermined degree, and includes a pair of side walls 19 and 20 rising from the corresponding flat parts 12 and a concaved part 23 formed as connecting tips of the side walls 19 and 20 to each other and concaved downward as seen in FIG. 5. The second rising parts 11 with the concaved parts 13 are formed to be connected intermittently in the second direction A2, which is substantially perpendicular to the first direction A1 in which the wave-like shape 9 having a plurality of ridge-trough cycles extends.

The second rising part 11 is curved inward, and an apex length L3 of the concaved port 23 along the first direction A1 is defined as being longer than an opening length L11 of a base part of the second rising part 11 along the first direction A1. The side walls 14 and 15 and the side walls 19 and 20 each form a stacked part 45 in the wave-like shape 9, 9a extending along at least one of the first direction A1 and the second direction A2. The stacked part 45 is formed by a part of the metal plate 4 being folded on the rest of the metal plate 4.

The metal cover 1 in this example has a size, for example, shown in FIG. 4 and FIG. 5. A length L1 of one ridge-trough cycle of the wave-like shape 9 along the first direction A1, the length L2 of the apex part 18 of the first rising part 10, and the length L3 of the concaved part 23 of the second rising part are 11 mm, 7 mm and 5 mm, respectively. Accordingly, the opening length L10 is shorter than the length of 7 mm, and the opening length L11 is shorter than the length of 5 mm.

As will be readily appreciated by these skilled in the art, the technological scope of the present invention is not limited to such sizes, and the sizes are appropriately selected in accordance with the specifications required of the metal cover 1 for which the present invention is carried out. The metal cover 1 has a shape as described above and is formed by pressing the metal plate 4 into a three-dimensional shape along the external shape of the exhaust manifold 3.

Figure 8:
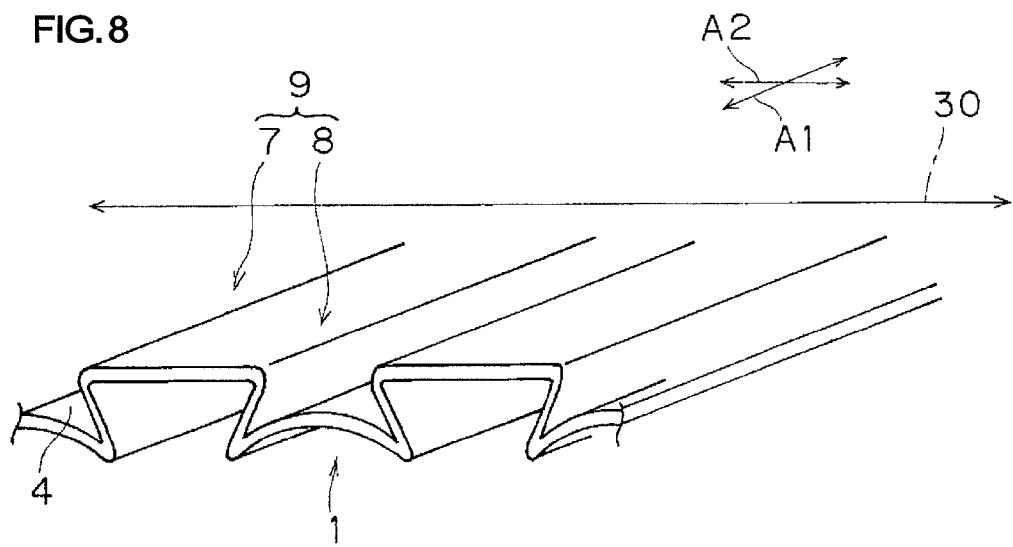
FIG. 8 is an isometric view for explaining a feature of the present invention.

Hereinafter, with reference to FIG. 8, one feature of the metal cover 1 in this example will be described. As described above, the metal cover 1 in this example is formed three-dimensionally along the external shape of the exhaust manifold 3. Therefore, as shown in FIG. 1, one or a plurality of ridgelines 30, along which the metal plate 4 is bent, are formed in the metal cover 1. In this example, the metal plate 4 is pressed into a three-dimensional shape such that the first direction A1 as a longitudinal direction of the wave-like shape 9 crosses main ridgelines described below among the plurality of ridgelines 30.

The main ridgelines 30 are folding lines along which relatively large curvatures characterizing the overall shape of the metal cover 1 are continued. Namely, the main ridgelines 30 are folding lines extending by a relatively long distance and substantially characterizing the external shape of the metal cover 1 among the various large and small folding lines formed in the metal cover 1.

Where the metal cover 1 is attached to the exhaust manifold 3, the vibration of the exhaust manifold 3 is transmitted and the metal cover 1 also vibrates. When the metal cover 1 thus vibrates, parts of the metal cover 1 which are on both sides of the main ridgelines 30 vibrates like fluttering. If the metal cover 1 is left vibrating in this manner, metal fatigue is caused in the vicinity of the ridgelines 30 of the metal cover 1 due to the repeated bending, and cracks are likely to be generated.

By contrast, in this example, the first direction A1 along which the wave-like shape 9 having a plurality of ridge-trough cycles is formed in the metal cover 1 is defined as crossing, preferably perpendicularly, the main ridgelines 30, and so the wave-like shape 9 acts as ribs on the vibration around the ridgelines 30. Due to this, the vibration of the metal cover 1 can be suppressed, and so the generation of cracks in the metal cover 1 can be prevented. Thus, the quality of the metal cover 1 can be significantly improved.

Figure 6:
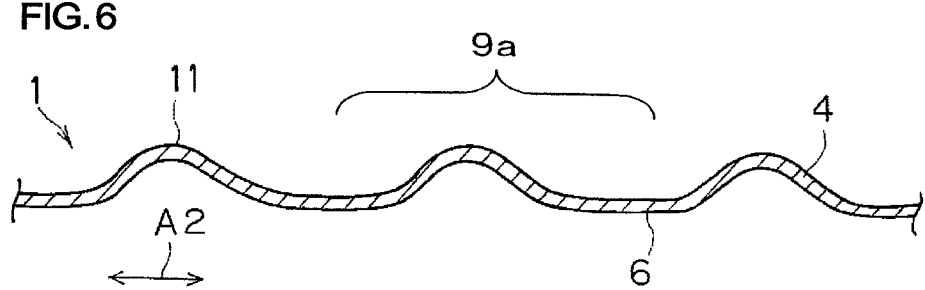
FIG. 6 is a cross-sectional view taken along line X6-X6 in FIG. 3.

In addition, against the vibration generated along the direction in which the ridgelines 30 extend, the second rising parts 11 shown in FIGS. 4 through 6 which intermittently extend in the second direction A2 and arranged in the first direction A1 also act as ribs and thus suppress the vibration.

In this example, as shown in FIG. 7, a flange 28 is formed in at least a part of an outer circumferential part of the metal cover 1. Due to this, the flange 28 acts as a rib when the metal cover 1 vibrates and can reduce the amplitude of the vibration of the metal cover 1. Thus, the generation of cracks in the metal cover 1 can be suppressed.

As described above, in this example, the metal cover 1 is formed of the metal plate 4 to have a three-dimensional shape. The wave-like shape 9 formed in the metal plate 4 includes a plurality of the ridges 7 and troughs 8 connected in the first direction A1. The height of each ridge 7 is changed periodically in the longitudinal direction thereof, namely, in the second direction A2. In addition, the first direction A1 is defined as perpendicularly crossing the main ridgelines 30 of the metal cover 1 forming the three-dimensional shape.

Accordingly, the wave-like shape 9 acts as ribs on the vibration of the parts on both side of the main ridgelines 30. Due to this, the situation in which the parts of the metal cover 1 on both sides of the main ridgelines 30 vibrate as fluttering due to the vibration from the exhaust manifold 3 is suppressed. Thus, the situation in which metal fatigue is caused in the vicinity of the ridgelines 30 of the metal cover 1 due to the repeated bending and cracks are likely to be generated is prevented.

Due to this, in this example, the vibration of the metal cover 1 can be suppressed, and so the generation of cracks in the metal cover 1 can be prevented. Thus, the quality of the metal cover 1 can be significantly improved.

The first direction A1 along which the wave-like shape 9 having a plurality of ridge-trough cycles is formed in the metal cover 1 is defined as crossing, preferably perpendicularly, the ridgelines 30 of the metal cover 1 as the product, and so the wave-like shape acts as ribs on the vibration around the ridgelines 30. Due to this, the vibration of the metal cover 1 can be suppressed, and so the generation of cracks in the metal cover 1 can be prevented. Thus, the quality of the metal cover 1 can be significantly improved.

Figure 9:
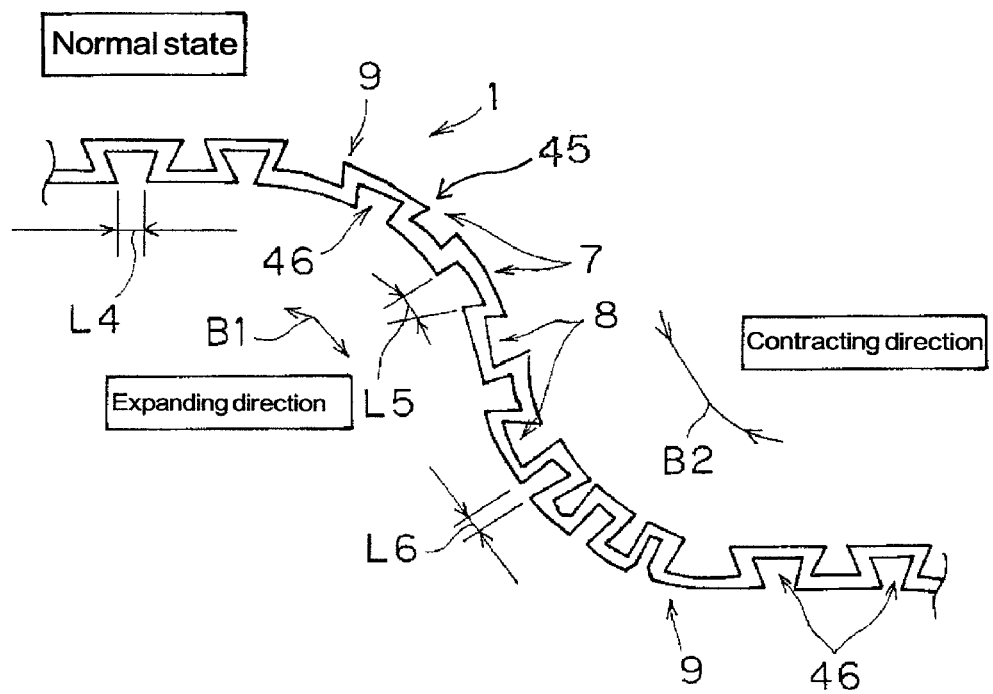
FIG. 9 is a cross-sectional view for explaining an expansion and contraction function of the metal cover 1.

FIG. 9 is a simplified cross-sectional view showing a function of the metal cover 1. Hereinafter, with reference to FIG. 9, the function of the metal cover 1 will be described. As described above, with the metal cover 1 in this example, the stacked parts 45 are formed in the metal plate 4 formed of an elastically deformable material and having the wave-like shape 9 formed on the substantially entire surface thereof.

Accordingly, when the metal cover 1 causes plane vibration due to the received vibration, the metal cover 1 operates as shown in, for example, FIG. 9, and deformation is caused at various sites of the entire surface of the metal cover 1 due to expansion and contraction. A width L4 is the width of an opening 46 of the ridge 7 in a standard state with no deformation. In an expanded part, the width L4 of the opening 46 becomes an expanded width L5 longer than the width L4. In a contracted part, the width L4 of the opening 46 becomes a contracted width L6 shorter than the width L4.

In this manner, each of the various sites of the wave-like shape 9 is deformed, i.e., expanded or contracted. Due to this, a significant part of the vibration applied to the metal cover 1 from outside is converted into thermal energy. Thus, the vibration of the metal cover 1 can be suppressed.

When the metal cover 1 entirely vibrates like fluttering due to a relatively low frequency component of the vibration applied thereon, the width L4 of the opening 46 of the ridge 7 in the standard state with no deformation becomes the expanded width L5 longer than the width L4 in an expanded part and becomes the contracted width L6 shorter than the width L4 in a contracted part, as shown in FIG. 9 as an example.

The stacked parts 45 are formed in the metal cover 1. The present inventors measured the length of one cycle of the wave-like shape 9 (hereinafter, referred to as the "cycle length") along the bending of the wave-like shape 9 in the case where the lengths L1, L2 and L3 have the above-mentioned values. As a result, a cycle length L0 was about 17 mm. This means that an expansion of about 55% is realized with respect to the length L1 of one cycle of the wave-like shape 9 (in this example, 11 mm).

In this example, aluminum is used for the metal plate 4. As compared with iron or stainless steel, aluminum is inferior in ductility and malleability and may have a problem of, for example, causing cracks when being pressed, especially deep-drawn. In this example, however, the metal plate 4 is equivalent to having about 55% of ductility and malleability, and so pressing including deep drawing can be done significantly more easily. This allows a light metal such as aluminum or the like to be used as the material of the metal cover 1, which reduces the weight of the metal cover 1. The processability is significantly improved.

When such a metal plate 4 is processed into the metal cover 1 as a product by pressing or the like, the stacked parts 45 are expanded or contracted as shown in FIG. 9. As a result, a portion of the metal plate 4 having the wave-like shape 9 which is expandable when the metal plate 4 is processed is significantly larger than a flat metal plate. This makes the metal plate 4 significantly easier to be processed than the flat metal plate. This functions/effects is conspicuous where the metal plate is formed of an aluminum alloy having a relatively low ductility than, for example, iron, stainless steel or the like.

In this example, as described above, undesired deformation or breakage of the metal cover 1 is prevented. Therefore, it is not necessary to increase the thickness of the metal plate 4 used for forming the metal cover 1 or to add a reinforcing component in order to increase the rigidity of the metal cover 1 or enlarge parts of the metal cover 1 supported by the exhaust manifold 3 and thus prevent the undesired deformation or breakage of the metal cover 1. Therefore, an increase of possibility that the metal cover 1 is broken at the supported parts due to the weight increase of the metal cover 1, which is assumed when the rigidity of the metal cover 1 is increased, or the breakage of the metal cover 1 due to heat distortion, which is assumed when the supported parts of the metal cover 1 is enlarged, can be prevented. For these reasons also, the reliability of the metal cover 1 is significantly improved.

Figure 10:
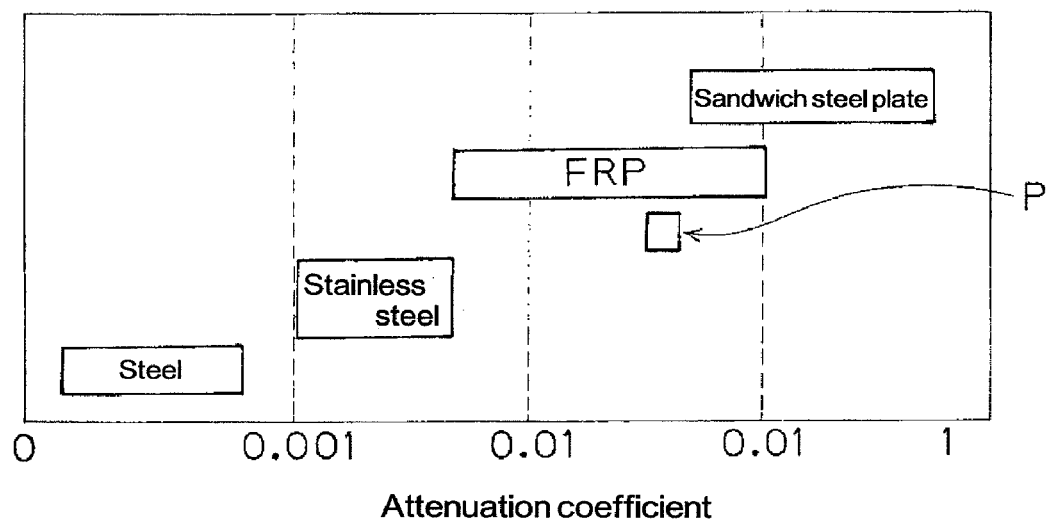
FIG. 10 is a graph for explaining a vibration damping function of the metal cover 1.

FIG. 10 is a graph for explaining a vibration damping performance of the metal cover 1. Hereinafter, with reference to FIG. 10 in addition to the above-mentioned figures, the vibration damping performance of the metal cover 1 will be described. In order to confirm the vibration damping performance of the metal cover 1 in this example, the present inventors measured the attenuation coefficient of a steel plate, a stainless steel plate, an FRP plate, a sandwich steel plate, and the metal cover 1 in this example in the state where these plates were vibrated. The results are shown in FIG. 10.

As a result of this measurement, it was confirmed that the vibration attenuation coefficient of the metal cover 1 in this example represented with area P in FIG. 10 is in a range higher than that of the steel plate and of the stainless steel plate and lower than that of the FRP (fiber-reinforced plastic) plate and of the sandwich steel plate. Thus, it was confirmed that the metal cover 1 in this example has a vibration attenuation coefficient lower than that of the sandwich steel plate having a structure in which different materials are stacked or the FRP plate containing inorganic fiber inside, but higher than that of the steel plate or the stainless steel plate often used as a material of the cover of the internal combustion engine, and so the metal cover 1 is significantly improved in the vibration damping performance than the conventional art.

Figure 11:
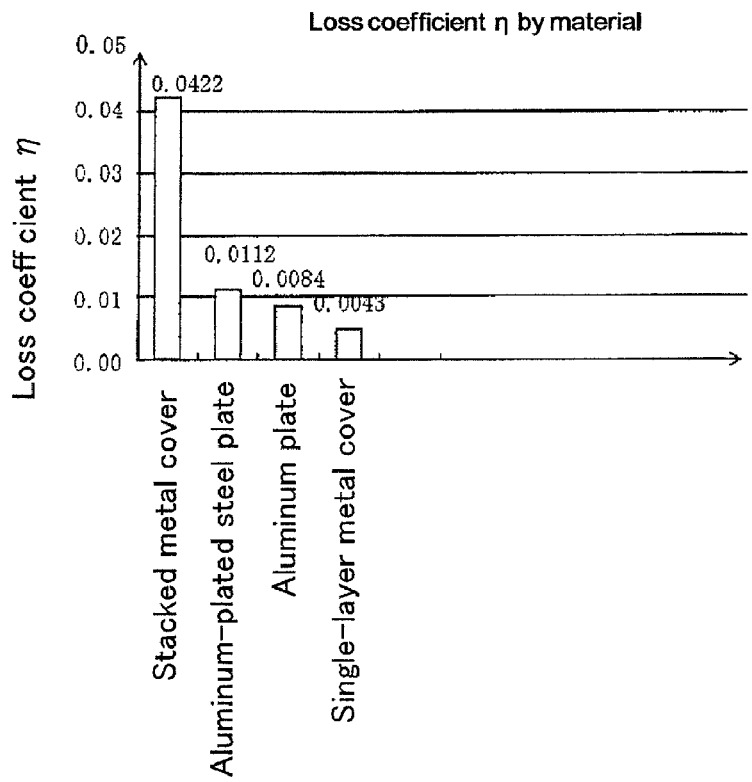
FIG. 11 is a graph showing a loss coefficient of the metal cover 1.

In order to confirm the vibration damping performance of the metal cover 1 in this example, the loss coefficient η was measured at room temperature on each of a sandwich steel plate formed of a single-layer aluminum-plated steel plate having a thickness of 0.5 mm, a single-layer aluminum plate having a thickness of 0.5 mm, the metal cover 1, and stacked flat aluminum plates each having a thickness of 0.3 mm and 0.125 mm. The measurement results are shown in FIG. 11. The loss coefficient of each material is shown in Table 1 below.

TABLE 1

| Material | Loss coefficient |
| --- | --- |
| Single-layer aluminum-plated steel plate | 0.0112 |
| Single-layer aluminum plate | 0.0084 |
| Metal cover 1 | 0.0043 |

From Table 1 and FIG. 11, it was confirmed that the vibration damping performance of the metal cover 1 in this example is lower than that of the sandwich steel plate or the aluminum plate having a thickness of 0.5 mm, but is higher than that of the stacked aluminum plate at room temperature.

Figure 12:
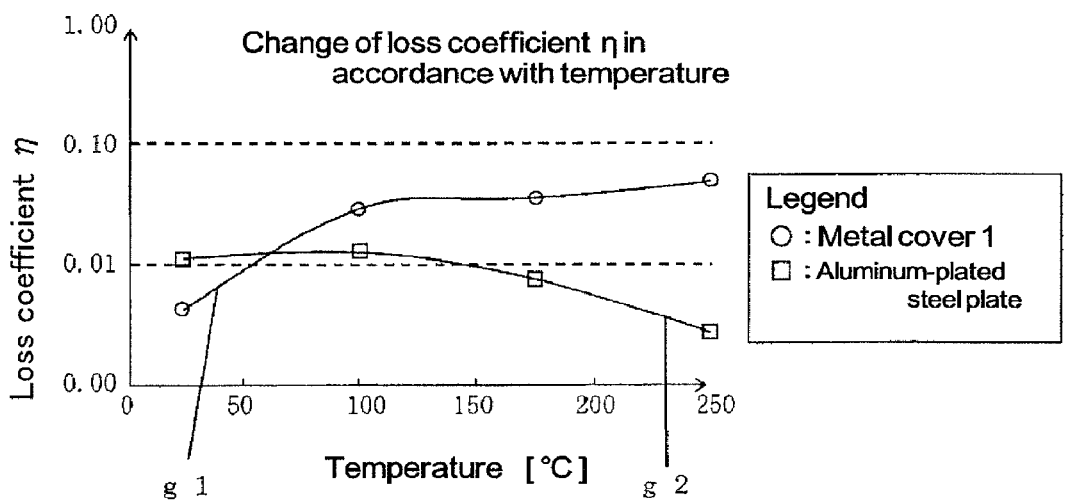
FIG. 12 is a graph showing a change of the loss coefficient of the metal cover 1 in accordance with the temperature.

FIG. 12 is a graph showing measurement results of a change of the loss coefficient η of the metal cover 1 in this example and of another material in accordance with the temperature. The range of temperature at which the measurement was performed was room temperature to about 250° C. Curve g1 represents the measurement result of the metal cover 1, and curve g2 represents the measurement result of the aluminum-plated steel plate having a thickness of 0.5 mm.

As a result of the measurement, it was confirmed that the loss coefficient of the metal cover 1 in this example is lower than that of the aluminum-plated steel plate in the temperature range of about 100° C. or lower, but is significantly higher than that of the aluminum-plated steel plate in the temperature range exceeding about 100° C.

Accordingly, when being used for a vibration source which generates heat, for example, as an automobile engine, the metal cover 1 exhibits good vibration damping performance while the engine is in operation.

The present invention is not explicitly limited to any of the above examples and encompasses a wide range of modifications without departing from the spirit of the present invention.

Especially, the wave-like shape 9 formed in the metal plate 4 of the metal cover 1 is not limited to the shape in the above example. Even where wave-like shape is arbitrary, the wave-like shape is obviously expanded or contracted by the vibration, and the vibration damping performance can be realized by the expansion and contraction.

As described above, according to this example, the following effects are provided. In this example, the wave-like shapes 9 and 9a are formed continuously in the first direction A1 and the second direction A2, respectively. Therefore, when the metal cover 1 formed of the metal plate 4 vibrates by the vibration applied thereto from outside, the vibration is converted into elastic deformation of the metal plate 4 at the troughs 8 and 8a and the ridges 7 and 7a in the wave-like shapes 9 and 9a. Due to this, a significant part of the vibration applied from outside is converted into thermal energy by the elastic deformation of the metal plate 4 itself. Thus, the vibration of the metal cover 1 caused by the vibration received by the metal plate 4 can be suppressed.

According to one or more embodiments of the present invention, when the material for processing is used for the vibration source, a product formed of the material for processing vibrates by the transmission of vibration from the vibration source. When the product vibrates, parts thereof on both side of the bending portions of the shape of the product vibrate as fluttering. When such vibration occurs, metal fatigue is caused in the vicinity of the bending portions of the product due to the repeated bending, and cracks are likely to be generated.

According to one or more embodiments of the present invention, the material for processing, which is to be processed into a product, has wave-like shapes in the first direction and the second direction. In the case where, for example, the first direction is defined as crossing, preferably perpendicularly, the bending portions of the product, the wave-like shapes act as ribs on the vibration around the bending portions. Due to this, the vibration of the product can be suppressed, and the generation of cracks in the product can be prevented. Thus, the quality of the product can be significantly improved.

In this example, when such a metal plate 4 is processed into the metal cover 1 of a desired shape by pressing or the like, the wave-like shapes 9 and 9a are expanded or contracted. Therefore, a portion of the metal plate 4 having the wave-like shapes 9 and 9a which is expandable when the metal plate 4 is processed is significantly larger than that of a flat metal plate 4. This makes the metal plate 4 in this example significantly easier to be processed than the flat metal plate. This functions/effects is more conspicuous where the metal plate 4 is formed of an aluminum alloy having a relatively low ductility and malleability than where the metal plate 4 is formed of, for example, iron, stainless steel, or the like having a relatively high ductility and malleability.

In this example, the metal cover 1 is formed by processing the metal plate 4 to have the wave-like shapes 9 and 9a. Therefore, where the metal cover 1 has a bent shape and one surface of the metal cover 1 is convexed, the other surface is concaved. In this state, on the convexed surface side, the interval between the ridges 7, 7a of the wave-like shape 9, 9a is enlarged; whereas on the other surface side, the interval between the ridges 7, 7a of the wave-like shape 9, 9a is shortened.

Therefore, when one surface of the metal plate 4 in this example (for example, the bottom surface in FIG. 4 and FIG. 5) is put into contact with a member having small concaved and convexed portions or a member having a relatively soft surface (hereinafter, such a member will be referred to as the "substrate"; not shown) and the metal plate 4 is bent together with the substrate, the interval between the ridges 7, 7a of the metal plate 4 on the side of the substrate is reduced in a portion in which the interval between the ridges 7, 7a of the wave-like shape 9, 9a of the metal plate 4 on the side of the substrate is reduced. Thus, the metal plate 4 and the substrate are meshed with, and fixed to, each other.

Therefore, the metal plate 4 can be attached to the substrate with no specific measure such as an adhesive or the like. For this reason also, the structure of the metal cover 1 in this example can be simplified and made compact.

In this example, the shape and structure of the metal cover 1 are defined by the shape of the metal plate 4 which has been processed into the metal cover 1. Accordingly, in this example, the shape and structure of the metal plate 4 before the metal plate 4 is processed into the metal cover 1 are arbitrary. Due to this, the example is applicable to a wide range of types of materials for processing as long as the shape and structure of the metal plate 4 which has been processed into the metal cover 1 fulfill the conditions defined in this example.

Example 2

Figure 13:
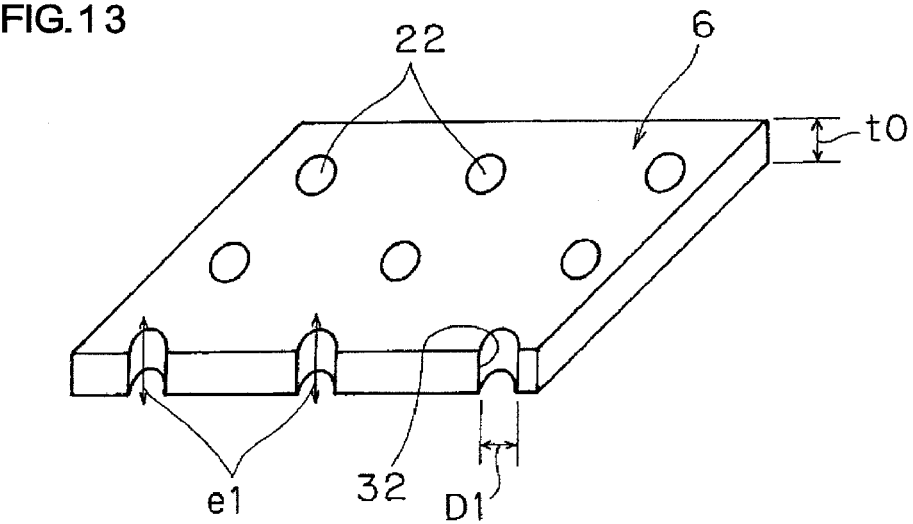
FIG. 13 is an isometric view of a metal plate 6 in Example 2 of the present invention.
Figure 14:
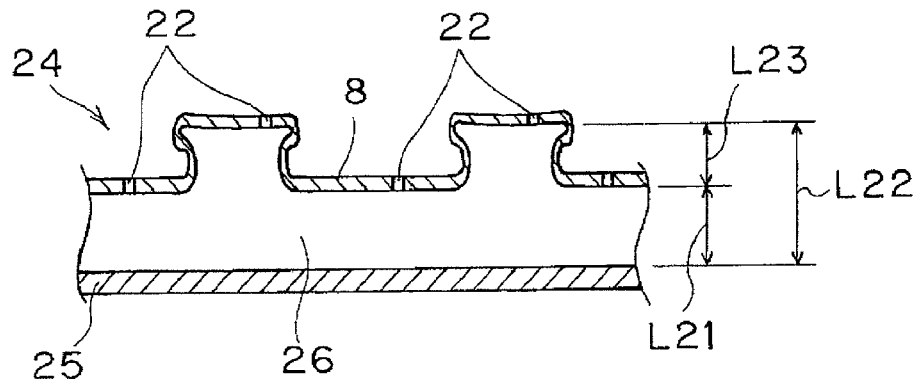
FIG. 14 is a simplified cross-sectional view of a metal cover 1a in Example 2.
Figure 15:
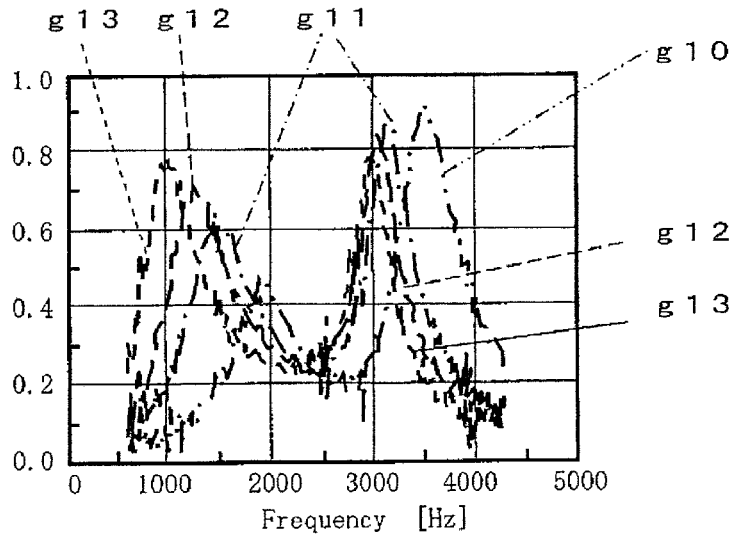
FIG. 15 is a graph for explaining a sound absorption characteristic of Example 2.
Figure 16:
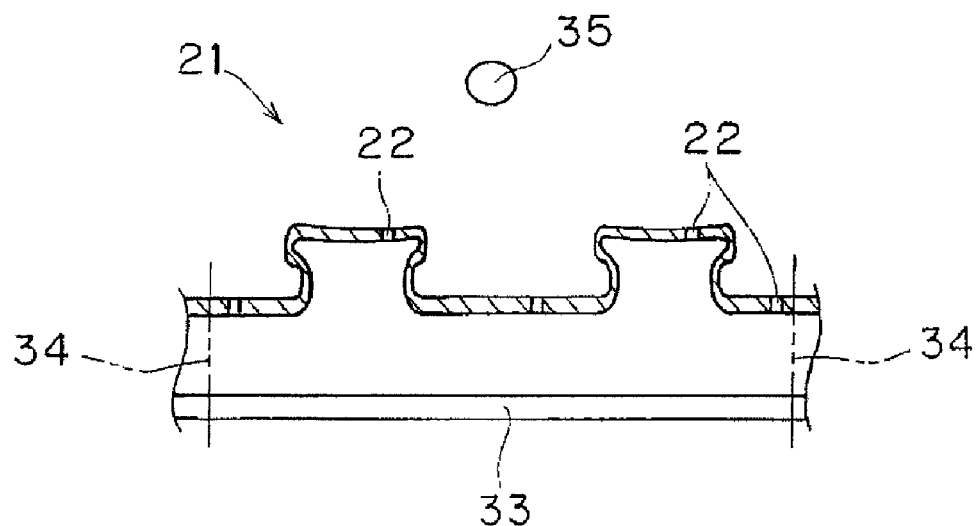
FIG. 16 is a conceptual view showing a structure of an examination device 21 based on Example 2.
Figure 17:
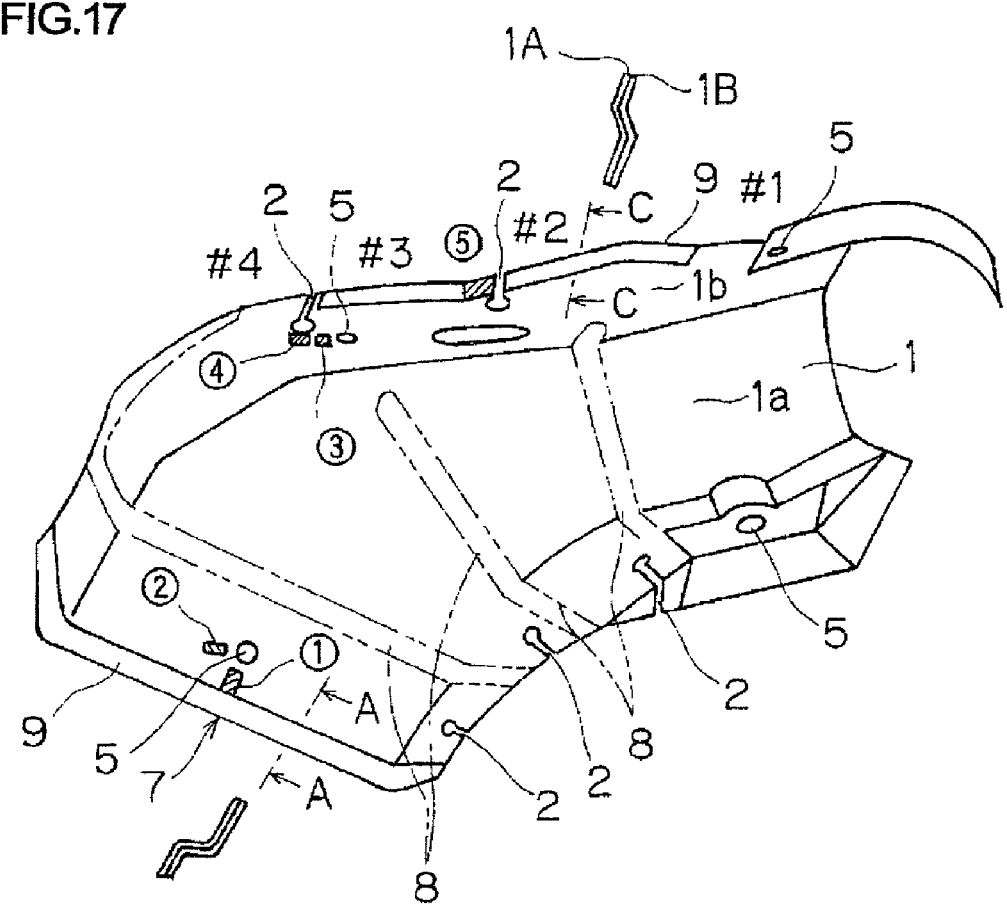
FIG. 17 is a graph for explaining the examination results obtained by the examination device 21 regarding the sound absorption characteristic.
Figure 18:
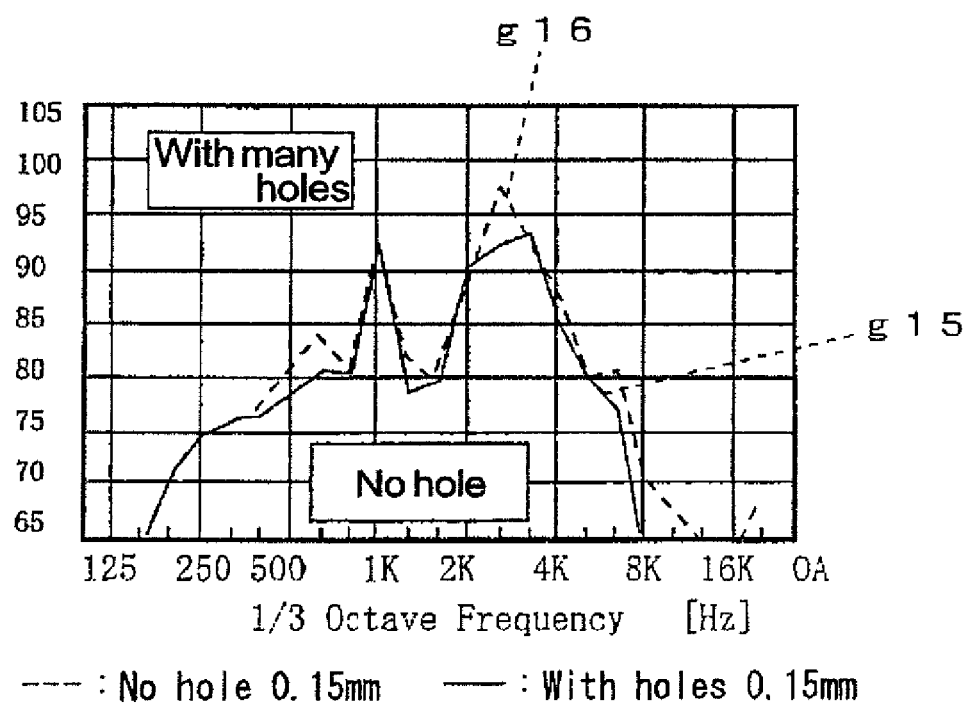
FIG. 18 is an isometric view of the conventional art.

Hereinafter, with reference to FIGS. 13 through 17 in addition to the above-mentioned figures, Example 2 according to one or more embodiments of the present invention will be described. FIG. 13 is an isometric view of a metal plate 6, which is a material of a metal cover 1a in this example. FIG. 14 is a simplified cross-sectional view of the metal cover 1a, which is a molded member in this example. FIG. 15 is a graph for explaining a sound absorption characteristic in this example. FIG. 16 is a conceptual view showing a structure of an examination device 21 based on this example. FIG. 17 is a graph for explaining the results of examination conducted by the examination device 21 on the sound absorption characteristic.

The metal cover 1a in this example is similar to that of Example 1, and corresponding elements will bear identical reference numerals thereto. One feature of this example is that many through-holes 22 are formed in the metal plate 6, which is a flat aluminum thin plate having a thickness of t0 and used for forming the cover 1. The through-holes 22 are formed such that air can move through the metal plate 6 in a plate thickness direction (upward and downward in FIG. 13). For example, the through-holes 22 have a cylindrical cross-section as shown in FIG. 13, but is not limited to this and may have a shape of a rectangular slit or any other shape. In this example, the thickness t0 is, for example, 0.15 mm. The through-holes 22 have an opening diameter of, for example, D1=0.5 mm and a numerical aperture of, for example, 0.1%.

According to an examination and an experiment performed by the present inventors, when sound input to the metal cover 1a passes the through-holes 22 as a compression wave, the opening diameter D1 of each through-hole 22 has a great influence on a function of converting the vibration energy provided by the friction of the circumferential edge of the through-hole 22 and the air into the thermal energy and a function of attenuating the energy by the pressure loss of the air flow.

As a result of the examination and the experiment performed by the present inventors, it was found that the opening diameter D1 with which the energy attenuation function is made by the pressure loss on the air passing the through-holes 22 is desirably 3 mm or less. The reason for this is that it was confirmed that when the opening diameter D1 is larger than 3 mm, the pressure loss at the time of the passage of the air is significantly decreased to a level significantly lower than the threshold value regarding the absorption ratio of the sound which is incident vertically on the metal plate 6 (=0.3). It was also confirmed that when the opening diameter D1 of the through-holes 22 is 1 mm or less, the air passing the through-holes 22 can be certainly provided with viscosity.

In this example, the metal plate 6 having many such through-holes 22 is corrugated in the first direction A1 and the second direction A2 as described above with reference to FIGS. 3 through 6. The metal cover 1a, which is the molded member in this example, includes a material 24 for processing shown in FIG. 14 obtained as a result of such corrugating processing and a rear plate 25, which is a partition member provided away from the material 24 for processing in the state where an air layer 26 having a predetermined distance L21 is sandwiched between the material 24 for processing and the rear plate 25.

The present inventors measured a change of the absorption ratio of the sound which is incident vertically on the metal cover 1a in this example in accordance with the change of the distance L21. FIG. 15 is a graph showing the measurement results, i.e., the frequency vs. absorption ratio of the vertically incident sound. Curves g10, g11, g12 and g13 represent the changes of the absorption ratio of the vertically incident sound when the distance L21 is 0 mm, 2 mm, 4 mm and 8 mm, respectively.

As understood from this graph, the absorption ratio of the vertically incident sound in this example has two peak frequency bands, i.e., a first frequency band f1 (1 to 2 kHz) and a second frequency band f2 (3 to 4 kHz). In FIG. 15, the first peak frequency band f1, which is lower of the two frequency bands, is a frequency band caused by resonance of the air layer, defined by a distance L22 between the ridges 7 and the rear plate 25, and the through-holes 22 formed in the ridges 7, and by the resonance of the air layer, defined by the distance L21 between the troughs 8 and the rear plate 25, and the through-holes 22 formed in the troughs 8. The second frequency band, which is the higher of the two frequency bands, is a frequency band caused by resonance of the air layer, defined by a distance L23 between the ridges 7 and the troughs 8, and the through-holes 22 formed in the ridges 7.

The present inventors examined the metal plate 6 having the structure shown in FIG. 13 and used for forming the metal cover 1a in this example, using the examination device 21 shown in FIG. 16. The examination device 21 includes a vibrator 33 and an attachment jig 34. For the examination, the metal plate 6 was attached to the vibrator 33 with the attachment jig 34, and the sound pressure level of the sound from the metal cover 1a was measured by sound pressure detection means 35 such as a microphone or the like installed in the vicinity of the metal plate 6 on the opposite side to the vibrator 33. The measurement results are shown in the graph of FIG. 17. Curve g15 represents the result on the metal cover 1a in this example having many through-holes 22, whereas curve g16 represents the result on the metal cover 1 with no through-holes 22.

As understood from the graph of FIG. 17, the sound pressure level of the sound from the metal cover 1a in this example with the through-holes 22 is lower than the level represented by curve g16 in each of frequency bands around 630 Hz, 1250 Hz and 2500 Hz. Thus, it was confirmed that the through-holes 22 provide a noise reduction effect.

Such a metal cover 1a in this example can realize a sound absorption function and a vibration-released sound reduction function described below.

Hereinafter, a function of the metal cover 1a in this example will be described. The metal cover 1a in this example has through-holes 22 formed in itself. Accordingly, when the metal cover 1a vibrates and the air passes the through-holes 22 in a direction of arrow e1, the energy is attenuated by the friction of an end face 32 which is a part of each of through-holes 22 of the material 24 for processing and the air.

The sound absorption performance provided by the energy attenuation occurs as a result of energy of sound wave, which is vibration of air, being converted into thermal energy. The sound absorption performance in the lower peak frequency band f1 is caused by the resonance of an air layer defined by the distance L22 between the ridges 7 and the rear plate 25 and an air layer defined by the distance L21 between the troughs 8 and the rear plate 25.

In this example, there are concaved and convexed portions in a planar direction formed of the troughs 8 and the ridges 7. Therefore, the sound absorption performance caused by the resonance of an air layer having the thickness L23 between a top surface of the ridges 7 and a bottom surface of the troughs 8 is also provided in the vicinity of the sound resonance frequency.

Due to such combined sound absorption effects, the vibration or noise caused by the material 24 for processing itself can be absorbed after the vibration or noise is generated, and thus can be reduced.

In this example, the metal plate 6 is easy to move entirely in the same phase due to the rib reinforcing effect provided by the ridges 7 and the troughs 8. It was confirmed that provision of the through-holes 22 in the metal plate 6 reduces the sound releasing efficiency, which is an energy conversion efficiency at which the vibration of the material 24 for processing is converted into sound, as compared with the case without the through-holes 22. Due to this, even where the material 24 for processing in this example is vibrating, the amplitude of the sound released from the material 24 for processing can be reduced.

It is known that the vibration-released sound reduction effect provided by forming the through-holes 22 in the metal plate 6 is decreased when the plane vibration of the metal plate 6 is partially different in amplitude and/or phase, namely, when there is a vibration distribution on the surface of the material 24 for processing. However, where there are concaved and convexed portions formed of the ridges 7 and the troughs 8 on the surface of the material 24 for processing and the above-described rib effect is provided as in this example, the vibration distribution can be reduced to make the vibration-released sound reduction effect conspicuous. Due to the vibration-released sound reduction effect, the noise generated by the material 24 for processing itself can be reduced.

In this example, when the metal cover 1a formed of the material 24 for processing vibrates by vibration from outside, such vibration is converted into elastic deformation of the metal plate 6 in the troughs 8 and the ridges 7 of the wave-like shape 9. Thus, a significant part of the vibration applied from outside is converted into thermal energy by the elastic deformation of the metal plate 6 itself. Thus, the vibration of the metal cover 1a caused by the vibration received by the material 24 for processing can be suppressed.

In this example, a vibration-released sound reduction effect on a frequency band, the sound of which is to be reduced, can be obtained by appropriately adjusting the opening diameter D1 of the through-holes 22, and the numerical aperture, the thickness t0, and the distance between the ridges 7 and the rear plate 25 or the troughs 8.

The material of the metal plate 6 used for forming the metal cover 1a in this example and the shape of the through-holes 22 are not limited to those in the examples, and the cases using the other materials are encompassed in the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS 1, 1a Metal cover
3 Exhaust manifold
4, 5, 6 Metal plate
7, 7a Ridge
8, 8a Trough
9, 9a, 9b Wave-like shape
12 Flat part
13 Concaved part
18 Apex part
21 Examination device
22 Through-hole
23 Concaved part
24 Material for processing
26 Air layer
32 End face
45 Stacked part
46 Concaved part
A1 First direction
A2 Second direction
D1 Opening diameter

What is claimed is:

1. A material for processing comprising:
an elastically deformable single thin plate comprising a plurality of through-holes,
the elastically deformable single thin plate comprising:
a first wave-like shape which is formed in a first direction and in which troughs and ridges are alternately connected in repetition, and
a second wave-like shape which is formed in a second direction crossing the first direction and in which troughs and ridges are alternately connected in repetition,
wherein the first wave-like shape has a corrugated shape in which the ridges each include a pair of side parts rising from the corresponding troughs and an apex part connected between the pair of side parts;
wherein an apex length of the apex part along the first direction is defined as being longer than an opening length, along the first direction, between base parts of the pair of side parts;
wherein the troughs and the ridges have the through-holes;
wherein the ridges are formed to have a predetermined height with respect to the troughs;
wherein the material for processing is attachable to a vibration generating member at a position a predetermined interval away therefrom; and
wherein the ridges and troughs reduce vibration distribution on a surface of the material caused by the through-holes.

2. A molded member comprising:
a material for processing according to claim 1 formed to have a three-dimensional shape in accordance with a vibration generating member; and
the vibration generating member to which the material for processing is attached at a predetermined interval.

3. A molded member according to claim 2, wherein either one of the first direction and the second direction of the material for processing is defined as crossing a ridge portion of the three-dimensional shape.

4. The material of claim 1, wherein an opening diameter of each of the through-holes is 3 mm or less.

* * * * *